United States Patent
Kang et al.

(10) Patent No.: US 10,337,610 B2
(45) Date of Patent: Jul. 2, 2019

(54) GEAR ACTUATOR FOR DUAL CLUTCH TRANSMISSION

(71) Applicant: HYUNDAI DYMOS INCORPORATED, Chungcheongnam-do (KR)

(72) Inventors: Seung Ik Kang, Seoul (KR); Man Bok Lee, Gyeonggi-do (KR)

(73) Assignee: HYUNDAI DYMOS INCORPORATED (KR)

( * ) Notice: Subject to any disclaimer, the term of this patent is extended or adjusted under 35 U.S.C. 154(b) by 442 days.

(21) Appl. No.: 15/355,932

(22) Filed: Nov. 18, 2016

(65) Prior Publication Data
US 2017/0146122 A1    May 25, 2017

(30) Foreign Application Priority Data

Nov. 25, 2015 (KR) .......... 10-2015-0165674

(51) Int. Cl.
| | |
|---|---|
| *F16H 61/32* | (2006.01) |
| *F16H 63/10* | (2006.01) |
| *F16H 61/688* | (2006.01) |
| *F16H 63/18* | (2006.01) |
| *F16H 61/28* | (2006.01) |
| *F16H 63/02* | (2006.01) |

(52) U.S. Cl.
CPC .......... *F16H 63/10* (2013.01); *F16H 61/32* (2013.01); *F16H 61/688* (2013.01); *F16H 63/18* (2013.01); *F16H 2061/2838* (2013.01); *F16H 2063/025* (2013.01)

(58) Field of Classification Search
CPC .......................... F16H 2063/025; F16H 63/10
USPC ................... 74/810.1, 473.12, 337.5
See application file for complete search history.

(56) References Cited

FOREIGN PATENT DOCUMENTS

| | | |
|---|---|---|
| DE | 101 36 232 A1 | 2/2003 |
| DE | 10 2008 000 637 A1 | 9/2009 |
| DE | 10 2014 212 750 A1 | 1/2016 |
| EP | 1 279 869 A2 | 1/2003 |
| KR | 101103969 B1 | 1/2012 |
| WO | 2014/081198 A1 | 5/2014 |
| WO | WO-2014081198 A1 * | 5/2014 ............. F16H 63/18 |

* cited by examiner

*Primary Examiner* — David M Fenstermacher
*Assistant Examiner* — Randell J Krug
(74) *Attorney, Agent, or Firm* — Tarolli, Sundheim, Covell & Tummino LLP

(57) ABSTRACT

Disclosed herein is gear actuator for dual clutch transmission, including: a driving motor having a driving shaft formed with gear part, a pair of first and second gears gear-coupled to the gear part, first and second guide cams respectively connected to the first and second gears to rotate, a first power transfer unit transferring or cutting off the power from the driving motor to the first guide cam according to rotating direction of the first gear, a second power transfer unit transferring or cutting off the power from the driving motor to the second guide cam according to rotating direction of the second gear, a first finger shaft linearly moved by rotation of the first guide cam and performing a selection operation of an odd-numbered stage, and a second finger shaft linearly moved by rotation of the second guide cam and performing a selection operation of an even-numbered stage.

7 Claims, 4 Drawing Sheets

1

GEAR ACTUATOR FOR DUAL CLUTCH TRANSMISSION

CROSS-REFERENCE TO RELATED APPLICATION(S)

This application claims priority to Korean Patent Application No. 10-2015-0165674, filed on Nov. 25, 2015, the disclosure of which is incorporated herein by reference in its entirety.

BACKGROUND OF THE INVENTION

Field of the Invention

Exemplary embodiments of the present invention relate to a gear actuator system for a dual clutch transmission, and more particularly, to a gear actuator system for a dual clutch transmission capable of enabling a gear selection operation of an odd-numbered/even-numbered stage using one motor in the dual clutch transmission.

Description of the Related Art

Recently, researches for improving fuel efficiency and developing an environmentally-friendly vehicle have been actively conducted worldwide. In order to improve fuel efficiency, an automatic transmission has been replaced with an automated manual transmission and a dual clutch transmission. Due to such trend, the dual clutch transmission may perform automatic speed change by a gear actuator and a clutch actuator.

In the dual clutch transmission, a first-stage gear, a third-stage gear, a fifth-stage gear, and a seventh-stage gear are connected to one clutch (hereinafter, referred to as a first clutch), and a second-stage gear, a fourth-stage gear, a sixth-stage gear, and an R-stage gear are connected to the other clutch (hereinafter, referred to as a second clutch), and a transmission control unit (TCU) may control speed change of the dual clutch transmission, such that the first clutch and the second clutch alternately transfer power to a flywheel thereby performing speed change.

Further, in the dual clutch transmission, a gear shift of the first-stage gear, the third-stage gear, the fifth-stage gear, and the seventh-stage gear is performed by a gear actuator different from that of the second-stage gear, the fourth-stage gear, the sixth-stage gear, and the R-stage gear. That is, the dual clutch transmission has an operation structure of selecting an odd-numbered stage and an even-numbered stage, respectively, by using two solenoids generating power.

However, in a gear actuator for a dual clutch transmission according to the related art, the number of drive units generating power is two among components configuring the actuator, such that a volume and a weight of the actuator are increased, and product cost is increased.

Accordingly, for the purpose of decrease in cost and volume and weight reduction, a more compact actuator system has been required to be developed.

RELATED ART DOCUMENT

Patent Document (Patent Document 1) Korean Patent Laid-Open Publication No. 10-2014-0116664A

SUMMARY OF THE INVENTION

An object of the present invention is to provide a gear actuator for a dual clutch transmission that use one drive unit for generating power to decrease a unit price of a product and lighten a product's weight, thereby improving fuel efficiency.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a gear actuator for a dual clutch transmission includes: a driving motor generating power and having a driving shaft formed with a gear part, a pair of first and second gears gear-coupled to the gear part to simultaneously rotate in different directions from each other and spaced apart from each other, first and second guide cams respectively connected to the first and second gears to rotate, a first power transfer unit provided at the first gear and the first guide cam to transfer or cut off the power from the driving motor to the first guide cam according to a rotating direction of the first gear, a second power transfer unit provided at the second gear and the second guide cam to transfer or cut off the power from the driving motor to the second guide cam according to a rotating direction of the second gear, a first finger shaft linearly moved by rotation of the first guide cam and having a first finger performing a selection operation of an odd-numbered stage, and a second finger shaft linearly moved by rotation of the second guide cam and having a second finger performing a selection operation of an even-numbered stage.

The first guide cam may include a first rotating member formed of a cylindrical member and coupled to the first gear by the first power transfer unit, a first cam profile formed along an outer circumferential surface of the first rotating member and including a straight-line section having a predetermined length and an inclined section as a groove, and a first guide protrusion protruding from the first finger shaft toward the first rotating member to be fitted into the first cam profile and moved along the first cam profile at the time of rotation of the first rotating member.

The second guide cam may include a second rotating member formed of a cylindrical member and coupled to the second gear by the second power transfer unit, a second cam profile formed along an outer circumferential surface of the second rotating member and including a straight-line section having a predetermined length and an inclined section as a groove having a predetermined depth, and a second guide protrusion protruding from the second finger shaft toward the second rotating member to be fitted into the second cam profile and moved along the second cam profile at the time of rotation of the second rotating member.

The first power transfer unit may include a first ratchet gear formed on the first gear at a surface opposite to gear teeth of the first gear, a first stopping member coupled to one surface of the first rotating member facing the first ratchet gear and caught by the first ratchet gear to stop rotation of the first gear, and a first elastic member having one end fixed to the first gear and the other end fixed to the first stopping member to elastically support the first stopping member with respect to the first gear.

The second power transfer unit may include a second ratchet gear formed on the second gear at a surface opposite to gear teeth of the second gear, a second stopping member coupled to one surface of the second rotating member facing the second ratchet gear and caught by the second ratchet gear to stop rotation of the second gear, and a second elastic member having one end fixed to the second gear and the other end fixed to the second stopping member to elastically support the second stopping member with respect to the second gear.

The second finger shaft may be formed in a pipe shape, reciprocate while being coupled to an outer portion of the first finger shaft so that the first finger shaft penetrates through the second finger shaft, and have a size smaller than the first finger shaft such that both ends of the first finger shaft protrude from both ends of the second finger shaft at a predetermined length.

The first finger and the first guide protrusion may be provided at both ends of the first finger shaft protruding from both ends of the second finger shaft, respectively, and spaced apart from both ends of the second finger shaft at a predetermined distance to prevent the first finger and the first guide protrusion from colliding with both ends of the second finger shaft, respectively, at the time of movement of the second finger shaft.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
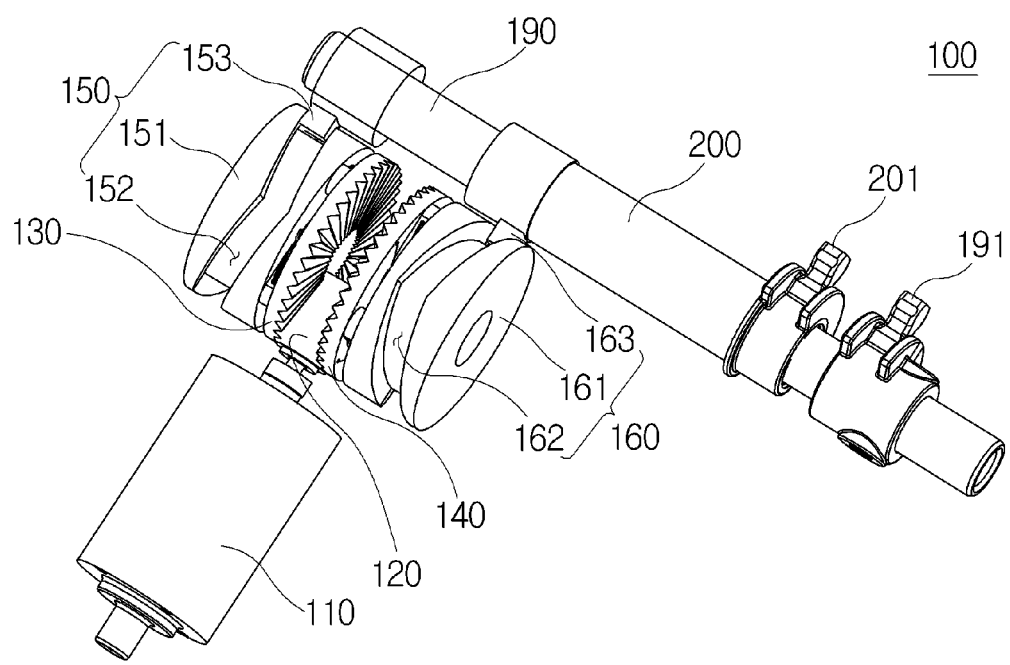
FIG. 1 is a perspective view illustrating a gear actuator for a dual clutch transmission according to an embodiment of the present invention.

Hereinafter, detailed embodiments of the present invention will be described with reference to the accompanying drawings. In such description, a thickness of a line, a size of components, and the like that are illustrated in the drawing may be slightly exaggerated for clarity of description and convenience of understanding. Further, terms used herein are defined in consideration of functions in the present invention and therefore may be changed depending on intention of a user or an operator, a practice, or the like. Therefore, the definition of the terminologies should be construed based on the contents throughout the specification.

Figure 2:
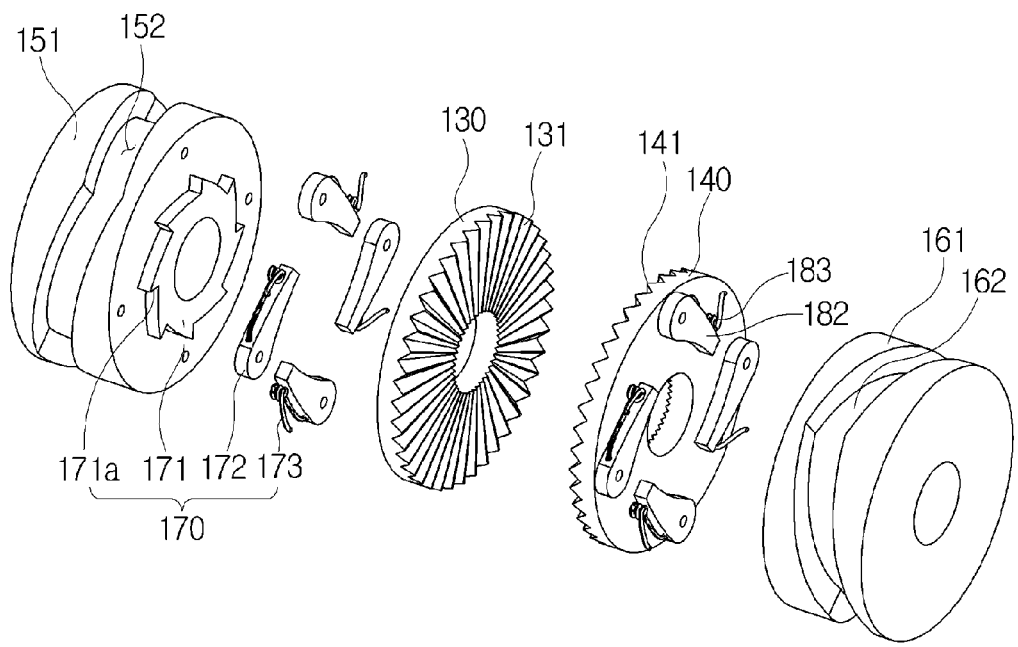
FIGS. 2 and 3 are exploded perspective views illustrating first and second guide cams and first and second gears of the gear actuator in FIG. 1.
Figure 3:
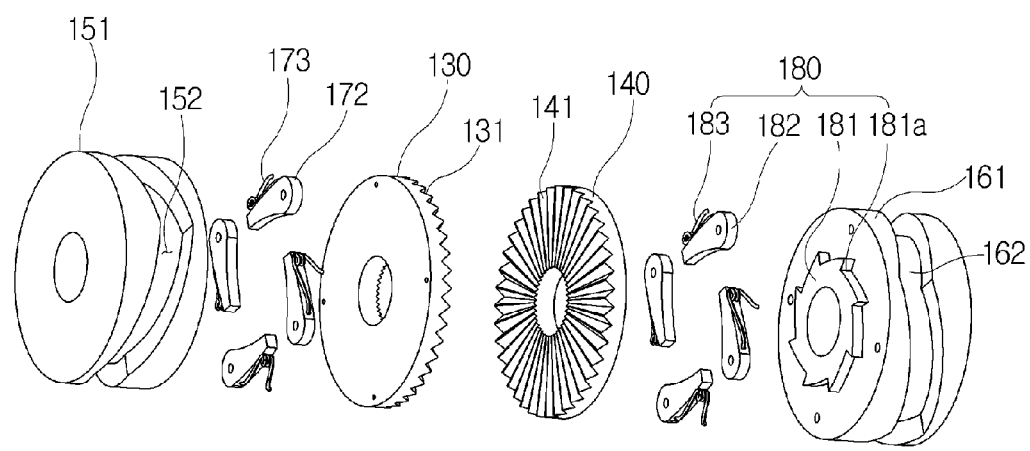
Figure 4:
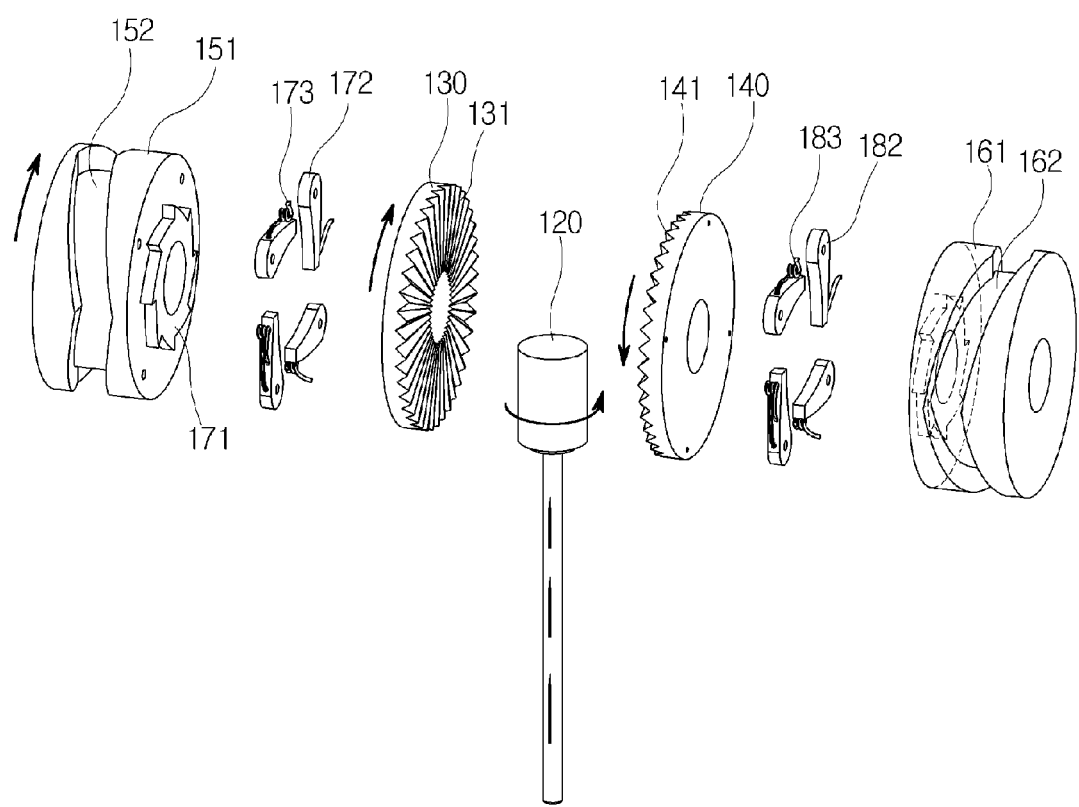
FIG. 4 is an exploded perspective view illustrating an operation state of the first guide cam and the first gear for a selection operation of an odd-numbered stage in the gear actuator in FIG. 1.
Figure 5:
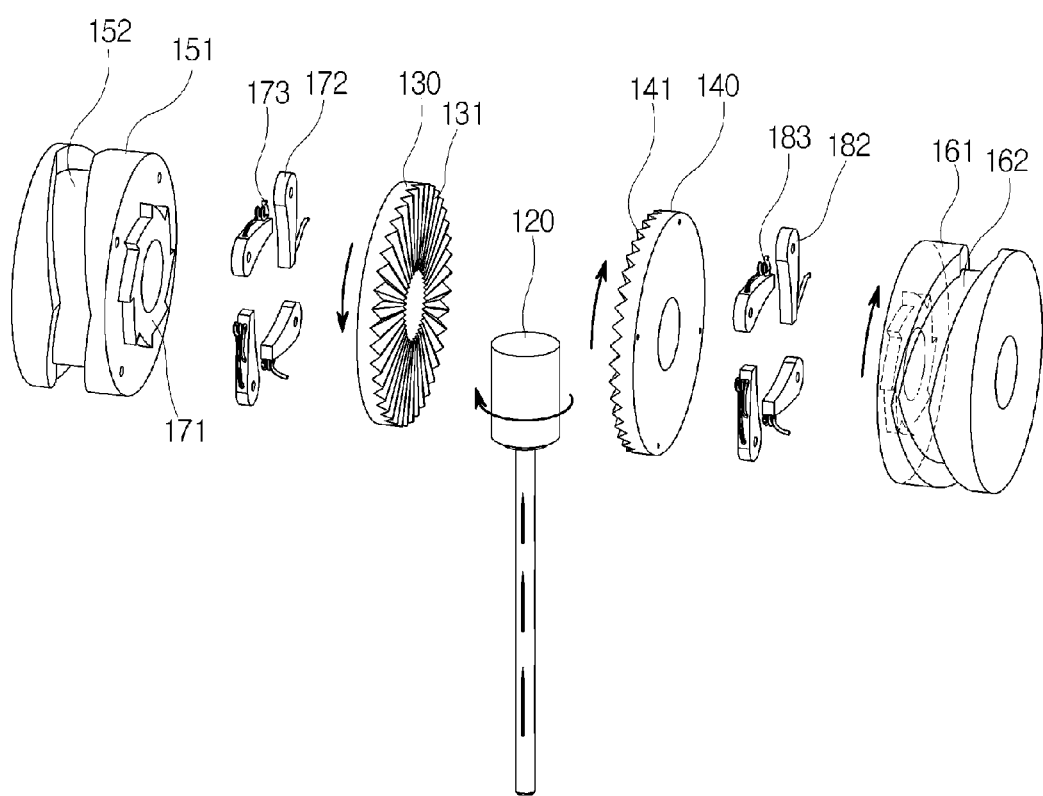
FIG. 5 is an exploded perspective view illustrating an operation state of the second guide cam and the second gear for a selection operation of an even-numbered stage in the gear actuator in FIG. 1.

FIG. 1 is a perspective view illustrating a gear actuator for a dual clutch transmission according to an embodiment of the present invention, and FIGS. 2 and 3 are exploded perspective views illustrating first and second guide cams and first and second gears of the gear actuator in FIG. 1. FIG. 4 is an exploded perspective view illustrating an operation state of the first guide cam and the first gear for a selection operation of an odd-numbered stage in the gear actuator in FIG. 1, and FIG. 5 is an exploded perspective view illustrating an operation state of the second guide cam and the second gear for a selection operation of an even-numbered stage in the gear actuator in FIG. 1.

As illustrated in drawings, a gear actuator 100 for a dual clutch transmission according to an embodiment of the present invention includes a driving motor 110 generating power, a gear part 120 provided at a driving shaft of the driving motor 110, a pair of first and second gears 130 and 140 gear-coupled to the gear part 120 to simultaneously rotate in different directions from each other and spaced apart from each other, first and second guide cams 150 and 160 respectively connected to the first and second gears 130 and 140 to rotate, first and second power transfer units 170 and 180 transferring or cutting off the power from the driving motor 110 to the first and second guide cams 150 and 160, respectively, a first finger shaft 190 linearly moved by rotation of the first guide cam 150 and having a first finger 191 performing a selection operation of an odd-numbered stage, and a second finger shaft 200 linearly moved by rotation of the second guide cam 160 and having a second finger 201 performing a selection operation of an even-numbered stage.

The driving motor 110 that generates power, is connected to an external power supply to be driven, and includes the driving shaft. The driving shaft has the gear part 120 having a screw thread shape formed on an outer circumferential surface thereof, and the first gear 130 and the second gear 140 are gear-coupled to the gear part 120 at the same time.

The first gear 130 is formed of a circular plate member, and one surface thereof is formed with gear teeth 131 gear-coupled to the gear part 120 of the driving shaft. Therefore, the first gear 130 is configured to rotate at the time of driving the driving motor 110. That is, the first gear 130 rotates in a clockwise direction or in a counterclockwise direction at the time of normal rotation and reverse rotation of the driving shaft when the driving motor 110 is driven.

The second gear 140 is disposed opposite to the first gear 130 and formed of a circular plate member, and one surface thereof is formed with gear teeth 141 gear-coupled to the gear part 120 of the driving shaft. The gear teeth 141 formed on one surface of the second gear 140 are positioned to face the gear teeth 131 of the first gear 130. Similar to the first gear 130, the second gear 140 is also configured to rotate at the time of driving the driving motor 110. The second gear 140 simultaneously rotates together with the first gear 130 and is gear-coupled to the gear part 120 of the driving shaft at a position opposite to the first gear 130 at the time of driving the driving motor 110, thereby rotating in an opposite direction to a rotating direction of the first gear 130.

The first guide cam 150 is connected to the first gear 130 by the first power transfer unit 170 to linearly move the first finger shaft 190, and includes a first rotating member 151, a first cam profile 152, and a first guide protrusion 153.

The first rotating member 151 is formed of a cylindrical member, and coupled to the first gear 130 by the first power transfer unit 170.

The first cam profile 152 is formed along a circumference of an outer surface of the cylindrical member, and includes a straight-line section having a predetermined length, and an inclined section formed to be connected to the straight-line section in a diagonal direction, in which both of the straight-line section and the inclined section are formed as a groove having a predetermined depth.

The first guide protrusion 153 is formed to protrude toward an outer circumferential surface of the first rotating member 151 from the first finger shaft 190, and moves along the first cam profile 152 at the time of rotation of the first rotating member 151. The first guide protrusion 153 may be formed as a separate member to be coupled to the first finger shaft 190 or may also be integrally formed with the first finger shaft 190.

The second guide cam 160 is connected to the second gear 140 by the second power transfer unit 180 to linearly move the second finger shaft 200, and includes a second rotating member 161, a second cam profile 162, and a second guide protrusion 163.

The second rotating member 161 is formed of a cylindrical member, and coupled to the second gear 140 by the second power transfer unit 180.

The second cam profile 162 is formed along a circumference of an outer surface of the cylindrical member, and includes a straight-line section having a predetermined length, and an inclined section formed to be connected to the straight-line section in a diagonal direction, in which both of the straight-line section and the inclined section are formed as a groove having a predetermined depth.

The second guide protrusion 163 is formed to protrude from the second finger shaft 200, and moves along the second cam profile 162 at the time of rotation of the second rotating member 161. The second guide protrusion 163 may be formed as a separate member to be coupled to the second finger shaft 200 or may also be integrally formed with the second finger shaft 200.

The first power transfer unit 170 is provided at the first gear 130 and the first guide cam 150 to transfer or cut off rotating force of the first gear 130 to the first guide cam 150 in the rotating direction of the first gear 130, and includes a first ratchet gear 171, a first stopping member 172, and a first elastic member 173.

The first ratchet gear 171 is formed on the first rotating member 151 at a surface facing the first gear 130. The first ratchet gear 171 is formed of upwardly inclined surfaces that toward one direction (e.g. counterclockwise direction) with respect to the rotating direction of the first gear 130, and end portions of the upwardly inclined surfaces toward the counterclockwise direction, so that a plurality of gear teeth are formed at a predetermined interval. Each of the plurality of gear teeth of the first ratchet gear 171 has a catching groove 171a by which an end of the first stopping member 172 is caught.

The first stopping member 172 is coupled to one surface of the first gear 130 facing the first ratchet gear 171, and is disposed in an opposite direction to a direction in which the gear teeth of the first ratchet gear 171 are inclined to be caught by the catching groove 171a of the first ratchet gear 171, thereby serving to transfer the rotation of the first gear 130 to the first rotating member 151.

That is, the first stopping member 172 is configured to be caught by the catching groove 171a formed by the gear teeth of the first ratchet gear 171 and of which the number is the same as that of the gear teeth of the first ratchet gear 171.

The first elastic member 173 has one end fixed to the first stopping member 172 and the other end fixed to the first gear 130 to elastically support the first stopping member 172 with respect to the first gear 130. The first elastic member 173 is configured to provide elastic force by being spread outwardly when the first stopping member 172 moves on the inclined surface of the gear teeth of the first ratchet gear 171 at the time of rotation of the first gear 120 in a state in which the first stopping member 172 is caught by the catching groove 171a of the gear teeth of the first ratchet gear 171.

The second power transfer unit 180 is provided at the second gear 140 and the second guide cam 160 to transfer or cut off rotating force of the second gear 140 to the second guide cam 160 in a rotating direction of the second gear 140, and includes a second ratchet gear 181, a second stopping member 182, and a second elastic member 183.

The second ratchet gear 181 is formed on the second rotating member 161 at a surface facing the second gear 140. The second ratchet gear 181 is formed of upwardly inclined surfaces that toward one direction (e.g. clockwise direction) with respect to the rotating direction of the second gear 140, and end portions of the upwardly inclined surfaces toward the clockwise direction, so that a plurality of gear teeth are formed at a predetermined interval. Each of the plurality of gear teeth of the second ratchet gear 181 has a catching groove 181a by which an end of the second stopping member 182 is caught.

The second stopping member 182 is coupled to the second gear 140, and is disposed in an opposite direction to a direction in which the gear teeth of the second ratchet gear 181 are inclined to be caught by the catching groove 181a of the gear teeth of second ratchet gear 181, thereby serving to stop the rotation of the second gear 130.

That is, the second stopping member 182 is configured to be caught by the catching groove 181a formed by the gear teeth of the second ratchet gear 181 and of which the number is the same as that of the gear teeth of the second ratchet gear 181.

The second elastic member 183 has one end fixed to the second stopping member 182 and the other end fixed to the second gear 140 to elastically support the second stopping member 182 with respect to the second gear 140. The second elastic member 183 is configured to provide elastic force by being spread outwardly when the second stopping member 182 moves on the inclined surface of the gear teeth of the second ratchet gear 181 at the time of rotation of the second gear 120 in a state in which the second stopping member 182 is caught by the catching groove 181a of the gear teeth of the second ratchet gear 181.

The first finger shaft 190 is formed in a pipe shape, is linearly moved by the first guide cam 150, and includes the first finger 191 for performing the gear selection operation of an odd-numbered stage (the first, third, fifth, or seventh-stages).

The second finger shaft 200 is formed in a pipe shape, and has an inner diameter larger than an outer diameter of the first finger shaft 190 to reciprocate while being coupled to the outer portion of the first finger shaft 190 so that the first finger shaft 190 penetrates through the second finger shaft 200. Further, the second finger shaft 200 is formed to be smaller than the first finger shaft 190, thus both ends of the first finger shaft 190 coupled to an inner circumferential surface of the second finger shaft 200 while penetrating through the second finger shaft 200, protrude from both ends of the second finger shaft 200 at a predetermined length.

That is, both ends of the second finger shaft are provided with the second guide protrusion 163 and the second finger 201, respectively, and both ends of the first finger shaft 190 protruding from both ends of the second finger shaft 200 are provided with the first guide protrusion 153 and the first finger 191, respectively. In addition, the first guide protrusion 153 and the first finger 191 are spaced apart from both ends of the second finger shaft 200 at a predetermined distance to prevent the second finger shaft 200 from colliding with the first finger 191 when the second finger shaft 200 is moved by the second guide cam 160.

An operation of the gear actuator for a dual clutch transmission according to the embodiment of the present invention as described above will be briefly described.

First, a gear selection operation of an odd-numbered stage (the first, third, fifth, or seventh stage) performed by operating the gear actuator 100 is described.

When the driving motor 110 is driven to rotate the gear part 120 provided at the driving motor 110, as illustrated in FIG. 4, for example, if the gear part 120 rotates in an arrow direction (counterclockwise), both of the first gear 130 and the second gear 140 that are gear-coupled to the gear part 120 are rotated. That is, when the gear part 120 rotates in the arrow direction (counterclockwise), the first gear 130 and the second gear 140 are rotated in the clockwise direction and in the counterclockwise direction, respectively, as shown by arrows in FIG. 4.

Here, the first stopping member 172 provided at the first gear 130 is caught by the first ratchet gear 171 in which tip portion and the catching groove 171a are formed in the counterclockwise direction on the first rotating member 151 in a state in which the end portion of the first stopping member 172 is disposed in the clockwise rotating direction. Then, the rotating force of the first gear 130 is transferred to the first rotating member 151 by the first stopping member 172 and the first ratchet gear 171, thereby rotating the first rotating member 151.

Next, the first guide protrusion 153 movably coupled to the first cam profile 152 of the first rotating member 151 is moved a predetermined distance by the rotation of the first rotating member 151. Accordingly, as the first finger shaft 190 integrally formed with the first guide protrusion 153 linearly moves, the first finger 191 provided at a position opposite to the first guide protrusion 153 linearly moves, thereby performing the selection operation of an odd-numbered stage.

Meanwhile, the second gear 140 rotates in an arrow direction in FIG. 4, and here, the second stopping member 182 coupled to the second gear 140 and having the end portion disposed in the opposite direction to the rotating direction (counterclockwise) of the second gear 140 moves along the inclined surface of the second ratchet gear 181 including the gear teeth of which the end is formed toward the counterclockwise direction on the second rotating member 161. Accordingly, the second rotating member 161 does not rotate but maintains a stopped state.

Hereinafter, a gear selection operation of an even-numbered stage (the second, fourth, sixth, and eighth stage) will be described.

When the driving motor 110 is driven and the gear part 120 provided at the driving motor 110 rotates in an arrow direction (clockwise direction) in FIG. 5, as illustrated in FIG. 5, for example, if the gear part 120 rotates in the arrow direction, the first gear 130 and the second gear 140 that are gear-coupled to the gear part 120 are rotated in the counterclockwise direction and the clockwise direction like the arrow directions in FIG. 5, respectively.

Here, the second stopping member 182 provided at the second gear 140 is caught by the second ratchet gear 181 in which tip portion and the catching groove 181a are formed in the opposite direction to the rotating direction of the second gear 140 in a state in which the end portion of the second stopping member 182 is disposed in the same direction as the rotating direction of the second gear 140. Then, the rotating force of the second gear 140 is transferred to the second rotating member 161 by the second stopping member 182 and the second ratchet gear 181, thereby rotating the second rotating member 161.

Next, the second guide protrusion 163 movably coupled to the second cam profile 162 of the second rotating member 161 is moved a predetermined distance by the rotation of the second rotating member 151. Accordingly, as the second finger shaft 200 integrally formed with the second guide protrusion 163 linearly moves, the second finger 201 provided at a position opposite to the second guide protrusion 163 linearly moves, thereby performing the selection operation of an even-numbered stage.

Meanwhile, the first gear 130 rotates in an arrow direction (counterclockwise) in FIG. 5, and here, the first stopping member 172 coupled to the first gear 130 and having the end portion disposed in the opposite direction to the rotating direction of the first gear 130 moves along the inclined surface of the first ratchet gear 171 of which the end and the catching groove 171a are formed toward the same direction as the rotating direction of the first gear 130. Accordingly, the first rotating member 151 does not rotate but maintains a stopped state.

According to the embodiments of the present invention, since the selection operation of the separately provided odd-numbered stage and even-numbered stage may be performed using one motor, it is possible to have a simple structure, efficiently use a space due to decreased volume and weight of components, and improve fuel efficiency.

Although the present invention has been described with reference to the exemplary embodiments shown in the accompanying drawings, they are only examples. It will be appreciated by those skilled in the art to which the present invention pertains that various modifications and equivalent other exemplary embodiments may be made from the present invention. Accordingly, the actual technical protection scope of the present invention must be determined by the appended claims.

INDUSTRIAL APPLICABILITY

The present invention that relates to a gear actuator for a dual clutch transmission may be used in a vehicle transmission-related industrial field.

What is claimed is:

1. A gear actuator for a dual clutch transmission, comprising:
   a driving motor generating power and having a driving shaft formed with a gear part;
   a pair of first and second gears gear-coupled to the gear part to simultaneously rotate in different directions from each other and spaced apart from each other;
   first and second guide cams respectively connected to the first and second gears to rotate;
   a first power transfer unit provided at the first gear and the first guide cam to transfer or cut off the power from the driving motor to the first guide cam according to a rotating direction of the first gear;
   a second power transfer unit provided at the second gear and the second guide cam to transfer or cut off the power from the driving motor to the second guide cam according to a rotating direction of the second gear;
   a first finger shaft linearly moved by rotation of the first guide cam and having a first finger performing a selection operation of an odd-numbered stage; and
   a second finger shaft linearly moved by rotation of the second guide cam and having a second finger performing a selection operation of an even-numbered stage.

2. The gear actuator for a dual clutch transmission of claim 1, wherein the first guide cam includes a first rotating member formed of a cylindrical member and coupled to the first gear by the first power transfer unit, a first cam profile formed along an outer circumferential surface of the first rotating member and including a straight-line section having a predetermined length and an inclined section as a groove, and a first guide protrusion protruding from the first finger shaft toward the first rotating member to be fitted into the first cam profile and moved along the first cam profile at the time of rotation of the first rotating member.

3. The gear actuator for a dual clutch transmission of claim 1, wherein the second guide cam includes a second rotating member formed of a cylindrical member and coupled to the second gear by the second power transfer unit, a second cam profile formed along an outer circumferential surface of the second rotating member and including a straight-line section having a predetermined length and an inclined section as a groove, and a second guide protrusion protruding from the second finger shaft toward the second rotating member to be fitted into the second cam profile and moved along the second cam profile at the time of rotation of the second rotating member.

4. The gear actuator for a dual clutch transmission of claim 2, wherein the first power transfer unit includes a first ratchet gear formed on the first gear at a surface opposite to gear teeth of the first gear, a first stopping member coupled to one surface of the first rotating member facing the first ratchet gear and caught by the first ratchet gear to stop rotation of the first gear, and a first elastic member having one end fixed to the first gear and the other end fixed to the first stopping member to elastically support the first stopping member with respect to the first gear.

5. The gear actuator for a dual clutch transmission of claim 3, wherein the second power transfer unit includes a second ratchet gear formed on the second gear at a surface opposite to gear teeth of the second gear, a second stopping member coupled to one surface of the second rotating member facing the second ratchet gear and caught by the second ratchet gear to stop rotation of the second gear, and a second elastic member having one end fixed to the second gear and the other end fixed to the second stopping member to elastically support the second stopping member with respect to the second gear.

6. The gear actuator for a dual clutch transmission of claim 1, wherein the second finger shaft is formed in a pipe shape, reciprocates while being coupled to an outer portion of the first finger shaft so that the first finger shaft penetrates through the second finger shaft, and has a size smaller than the first finger shaft such that both ends of the first finger shaft protrude from both ends of the second finger shaft at a predetermined length.

7. The gear actuator for a dual clutch transmission of claim 2, wherein the first finger and the first guide protrusion are provided at both ends of the first finger shaft protruding from both ends of the second finger shaft, respectively, and spaced apart from both ends of the second finger shaft at a predetermined distance to prevent the first finger and the first guide protrusion from colliding with both ends of the second finger shaft, respectively, at the time of movement of the second finger shaft.

* * * * *